UNITED STATES PATENT OFFICE.

JOHN A. YUNCK, OF SOUTH ORANGE, NEW JERSEY.

PROCESS OF TREATING COPPER AND OTHER METALS.

No. 825,100.        Specification of Letters Patent.        Patented July 3, 1906.

Application filed February 3, 1903. Serial No. 141,679.

*To all whom it may concern:*

Be it known that I, JOHN A. YUNCK, a citizen of the United States, residing at South Orange, county of Essex, State of New Jersey, have invented a certain new and useful Improved Process of Treating Copper and other Metals, of which the following is a specification.

My invention relates generally to the deoxidation or other purification of metals and alloy, so as to prepare them for the casting of sound and flawless ingots free from blow-holes or impurities which tend to interfere with such metals being cast, rolled, or drawn out into the various forms in which they are used in the arts. It has heretofore been proposed to remove such impurities by combining them with an alkaline metal, such as sodium, through the introduction of said material into the crucible or melting-pot and causing the same to combine with the oxid of the metal, and thereby remove the oxygen; but the processes heretofore employed have been costly, in that they wasted a large proportion of the high-priced compounds of sodium which they require. They have also been imperfect in their action and hurtful to the product, in that they leave in the treated metal certain substances which are unduly affected by the action of any acid to the action of which said metal may subsequently be subjected.

I have discovered that by forming a suitable compound of an alkaline carbonate, such as sodium carbonate or potassium carbonate and carbon, the latter preferably in the form of free carbon, such as charcoal, coke, anthracite coal, and the like, which compound will be reduced at the temperature of melting metal and give off a vapor of the alkali in a nascent condition, the oxids of the metal can be reduced and the oxygen entirely removed by combination with such alkali in a nascent condition if the compound is thoroughly mixed with the metal to be treated at and before the point of melting of the same. Economy of the alkaline materials is conserved and the throughness of the reaction is heightened if to the compound above mentioned a third ingredient is added which will tend to retard the too rapid ebullition of the alkaline gas and its combination with the oxygen. When sodium carbonate is employed, I find a small quantity of carbonate of lime to be useful as such retarder. Where potassium carbonate is used, I find bitartrate of potassium, ($KHC_4H_4O_4$,) commonly known as "cream of tartar," to serve the purpose. Possibly other materials may also act as retarder in this operation.

The use of sodium or sodium-producing material is deemed to be preferable, although potassium or potassium-producing materials may be employed with good results, or combinations of sodium and potassium or of materials producing them may be used.

So far as is now known practical operation of this process is best accomplished as follows: to thirty parts of powdered carbon and five parts of coarser or granular carbon add five parts of carbonate of lime ($CaOCO_3$) and sixty parts of sodium carbonate, ($Na_2CO_3$.) Thoroughly mix in water until the sodium carbonate dissolves, then evaporate to dryness, and crush the residue. If copper is to be treated, the comminuted material thus prepared is mixed with the copper in the proportion of about one part, by weight, of the compound to nineteen parts of the copper. This mixture may be placed cold in a crucible or melting-pot and then fused; but preferably I place only about ten per cent. of the proportion of the sodium compound in the crucible cold with the copper and add the remaining ninety per cent. when the first mixture has fused. This I find more economical, as the sodium compound begins to fuse before the copper and there is a loss by evaporation before the fusion of the copper is effected when the whole proportion of the compound is put into a crucible cold.

When the above process is followed out, the molten mixture should preferably be stirred for four or five minutes. A crust or scum of sodium oxid thereupon forms on the surface of the bath, and the pure copper can be thereafter poured into molds, forming ingots free from blow-holes. If these are allowed to cool slowly, they will be very hard, and to anneal them they may be heated to redness and plunged into cold water.

Some portions of the compound originally introduced will remain in the bottom of the crucible and adhering to the sides; but these need not be removed, as they will assist to repeat the above action in the same manner upon the next crucibleful of the mixture and an economy of material results.

I prefer to use a crucible sealed except for a small vent, as this also results in economy, retaining the gases generated in contact with the bath, preventing too violent and rapid ebullition, and also oxidation of the bath by the atmosphere.

As at present understood the following reactions characterize the above-described process: When the temperature is raised to or above the fusing-point of copper, the sodium carbonate and carbon combine, forming vapor of sodium in a nascent condition and carbonic acid or oxid. The sodium in its nascent condition combines with the oxid of the metal to form an oxid of soda, which rises to the surface of the bath and floats there as a crust, leaving the pure copper below. This action between the sodium and oxid of copper is assisted by stirring and by the partial closure of the crucible, which retains the gases and insures their intimate contact with the metal. It is also rendered more perfect by the action of the retarder, which prolongs the reaction and prevents the instantaneous formation and liberation of the gaseous sodium before it has opportunity to thoroughly take up the oxygen, as is apt to be the case if sodium carbonate alone is used. The intimate mixture of the sodium carbonate and carbon prior to their introduction into the crucible is important, because the carbon is then distributed evenly throughout the bath with the sodium carbonate and stands ready to pick up promptly every particle of the $CO_3$ and so leave the sodium in a nascent condition, hungry for the oxygen of the oxid of copper. The fact that when the retarder is used the sole residue formed is one apparently not readily soluble in the molten copper is also important, as it prevents the carrying over into the ingot-mold of ingredients which might interfere with the subsequent working and use of the copper, as by their sensitiveness to action of acids, &c.

The copper ingot produced by my process is sound and free from blow-holes and impurities and can be rolled out into thin sheets or drawn down to fine wire, either pure or in alloys with other metals. It is also able to stand several remeltings without loss of these properties and may be used to make excellent castings of any desired shape.

In some cases I prefer to work the deoxidizing compound up into cakes instead of employing the same in comminuted form. Thus cakes of various weights could be prepared and introduced into the crucible at the proper time by the workmen without their being compelled to weigh the same.

Having therefore described my invention, I claim—

1. The process of deoxidizing metals which consists in the following steps: first, forming a compound containing an alkaline carbonate and carbon; second, mixing said compound with the metal to be deoxidized; third, melting the mixture so produced.

2. The process of deoxidizing metals which consists in the following steps: first, forming a compound containing an alkaline carbonate and carbon; second, pulverizing said compound; third, mixing said pulverized compound with the metal to be deoxidized; fourth, melting the mixture so produced.

3. The process of deoxidizing metals which comprises the following steps: first, forming a compound containing an alkaline carbonate and carbon; second, mixing the compound and the metal to be treated at and before the point of melting; third, melting the mixture so formed.

4. The process of deoxidizing metals which consists in the following steps: first, forming a compound containing an alkaline carbonate and carbon; second, mixing said compound with the metal to be deoxidized; third, melting the mixture so produced; fourth, stirring the bath so formed before pouring.

5. The process of deoxidizing metals which consists in the following steps: first, forming a compound containing an alkaline carbonate and carbon; second, mixing said compound with the metal to be deoxidized; third, melting the mixture so produced in a nearly-closed vessel.

6. The process of deoxidizing metals which consists in the following steps: first, forming a solution of an alkaline carbonate and free carbon, evaporating to dryness and crushing the residue; second, mixing the crushed residue formed by the first step and the metal to be deoxidized at and before the point of melting; third, melting the mixture in a nearly-closed vessel; fourth, stirring the bath so formed before pouring.

7. The process of deoxidizing metals which comprises the following steps: first, forming a compound containing an alkaline carbonate and carbon with a retarder by dissolving the ingredients, and then evaporating to dryness; second, mixing said compound and the metal to be deoxidized; third, melting the mixture so produced.

8. The herein-described process of deoxidizing copper, which comprises mixing the copper and a compound containing carbonate of lime, carbon and sodium carbonate, and melting the mixture.

9. The process of deoxidizing metals which consists in the following steps: first, forming a compound containing an alkaline carbonate and carbon with a retarder; second, mixing said compound and the metal to be deoxidized; third, melting the mixture so produced.

10. The process of deoxidizing metals which comprises essentially the intimate mixture of the fused metals with a previously-prepared compound of an alkaline carbonate and carbon.

In testimony whereof I have hereunto subscribed my name.

JNO. A. YUNCK.

Witnesses:
   JOHN S. RILLING,
   HALBERT C. MILLER.